United States Patent [19]

Hartung

[11] 4,384,736
[45] May 24, 1983

[54] PRESSURE GAGE ATTACHMENT FITTING FOR TUBULAR CONDUIT SYSTEM

[75] Inventor: Ronald F. Hartung, Lakeland, Fla.

[73] Assignee: International Minerals & Chemical Corp., Terre Haute, Ind.

[21] Appl. No.: 224,363

[22] Filed: Jan. 12, 1981

[51] Int. Cl.³ .............................................. F16L 41/00
[52] U.S. Cl. ......................................... 285/93; 277/1; 277/235 A; 285/156; 285/363
[58] Field of Search .................. 285/93, 156, 363, 368, 285/55; 277/235 A, 235 R, 1

[56] References Cited

U.S. PATENT DOCUMENTS

| | | | |
|---|---|---|---|
| 1,896,795 | 2/1933 | Kendall | 285/363 X |
| 2,460,238 | 1/1949 | Penick | 166/14 |
| 3,047,937 | 8/1962 | Vecchi | 285/55 X |
| 3,141,685 | 7/1964 | Watts | 285/93 |
| 3,884,511 | 5/1975 | Hermanson | 285/93 |
| 4,101,149 | 7/1978 | Fleischer et al. | 285/55 |
| 4,285,500 | 8/1981 | Illing et al. | 285/156 X |

FOREIGN PATENT DOCUMENTS

| | | | |
|---|---|---|---|
| 2354777 | 5/1975 | Fed. Rep. of Germany | 285/93 |
| 475499 | 8/1969 | Switzerland | 285/93 |

*Primary Examiner*—Thomas F. Callaghan
*Attorney, Agent, or Firm*—H. J. Barnett; Robert H. Dewey

[57] ABSTRACT

A ring member having an opening extending radially therethrough to provide access between the inside and outside of said ring member. The ring member is disposed between the ends of two adjacent pipe sections, and is in sealing engagement therewith.

The opening in the ring member provides mounting means for a pressure gage, or an access fitting to the pipeline to add dye materials or other reagents. The adjacent pipe sections may be rotated to equalize wear without rotating the ring member so that the pressure gage may be maintained on the top of the pipeline for ready access.

3 Claims, 4 Drawing Figures

PRESSURE GAGE ATTACHMENT FITTING FOR TUBULAR CONDUIT SYSTEM

BACKGROUND

Pipeline systems which are used to transport granular slurry materials tend to wear non-uniformly. To counteract uneven wear, and get the maximum life from such pipes, the sections of pipe are rotated on a regular basis.

In such slurry systems, pressure gages are mounted directly on the pipe to monitor fluid pressure to insure that slurry flow through the pipe is not interrupted, and to insure that pressure does not build up to unsafe levels. When the pipe sections are rotated to obtain uniform wear, the pressure gages rotate with the pipe, creating a major inconvenience in reading the gages, especially when they are disposed under the pipe sections, which are usually laid just above the ground.

In the past, the practice has been to tap a small hole in the pipewall and to mount the pressure gage directly on a pipe section in communication with the hole in the pipewall. When such pipe sections are rotated to insure even internal wear, it is necessary to remove the pressure gage, rotate the pipe section the desired amount, and then tap a new hole on the top of the pipewall. The old hole from which the pressure gage is removed is then plugged, as by welding.

The above practice is expensive, and requires coordination of pipe rotation with the availability of skilled welders, which can be an added expense because of the remote locations of the pipelines. In addition, each plugged gage mounting hole represents a potential weak point in the pipe.

PRIOR ART

A casing head sealing system is shown in U.S. Pat. No. 2,460,238. A pressure gage is mounted on the fitting, but the gage does not communicate directly with the fluid contents of the conduit. It merely senses the pressure *behind* the casing head seal to detect leaks in the seal.

U.S. Pat. No. 3,141,685 is directed to a leak detecting means for a pipe coupling, but the conduit for the pressure gage does not connect to the main pipeline, but to a chamber *behind* the seal. U.S. Pat. No. 3,884,511 is similar, but in addition, the chamber to which the pressure gage is connected is charged with nitrogen gas to provide additional sealing. None of the above patents involve a slurry pipeline system in which it is necessary to rotate the pipe sections periodically to equalize wear.

SUMMARY

The present invention is directed to an annular fitting for attaching a pressure gage on a pipeline which is readily disposed between two pipe sections, and which can remain upwardly oriented when the pipe sections are rotated to equalize wear of the inner surfaces of the pipe. The retapping, plugging and remounting steps of the prior procedure are eliminated by the novel fitting of the subject invention.

DETAILED DESCRIPTION

DESCRIPTION OF THE PREFERRED EMBODIMENT

Figure 1:
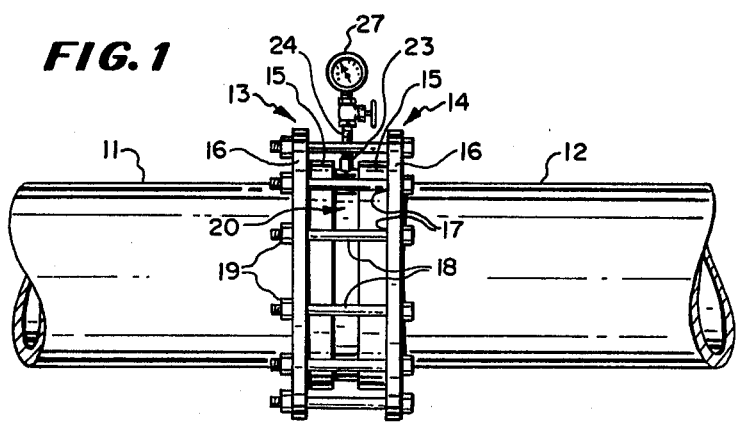
FIG. 1 of the drawings is a side elevation showing the pressure gage fitting of the subject invention installed between two sections of pipe used for conducting a slurry in a phosphate rock mining operation.

As shown in the drawings, pipe sections 11 and 12 have stepped flanges 13 and 14 at their adjacent ends. The flanges 13 and 14 are integral with the respective pipe ends and each comprises a smaller diameter, thick flange 15 at the outermost end of the pipe section, and a larger diameter, bolting flange 16 which is disposed adjacent to the thick flange 15, and which is provided with a plurality of bolt holes 17 for receiving attachment bolts 18 which are held in place by nuts 19.

Pressure gage attachment fitting 20 is disposed in sealing engagement between the thick flanges 15 of the adjacent pipe sections 11 and 12. Fitting 20 comprises a steel hoop 21 which has an opening 22 extending radially therethrough. Opening 22 is connected to a tubular pressure gage mounting stem 23 to provide communication between fluid inside the pipe sections 11 and 12 and a pressure gage fitting 24, which is detachably mounted on the outer end of the mounting stem 23.

Figure 2:
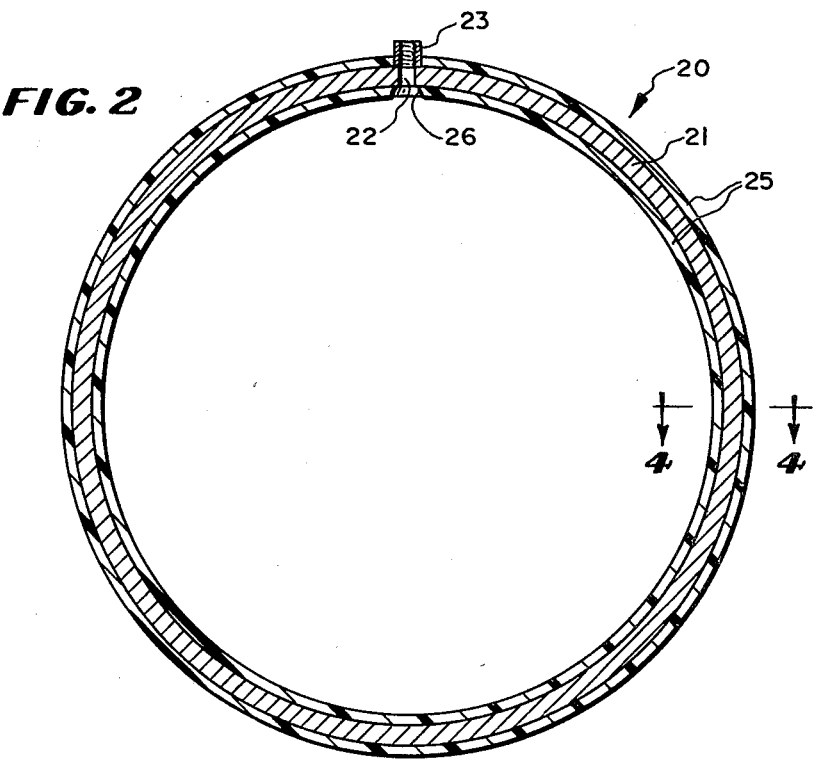
FIG. 2 is an enlarged transverse sectional view of the annular pressure gage fitting of the subject invention.
Figure 3:
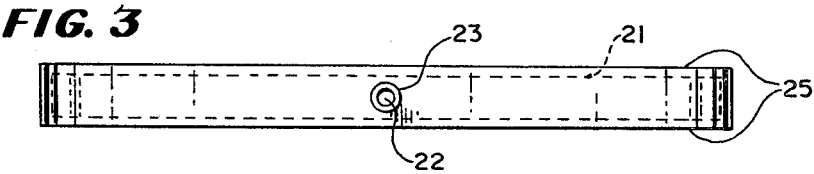
FIG. 3 is an enlarged side view with parts shown in phantom of the fitting shown in FIG. 2.
Figure 4:
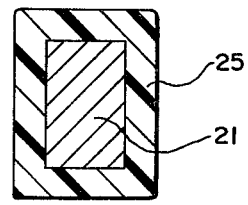
FIG. 4 is an enlarged sectional view taken on lines 4—4 of FIG. 2.

The steel hoop 21 is surrounded by a molded urethane sealing gasket 25, best seen in FIGS. 2, 3 and 4. The sealing gasket 25 completely encloses the hoop 21, except for pipe sleeve 23. Opening 26 in the sealing gasket 25 is alined with the pipe sleeve 23 to allow fluid communication therethrough.

When the pressure gage attachment fitting 20 is mounted in place, it is disposed in abutting relationship with the outer ends of the thick flanges 15 of the stepped flanges 13 and 14. The bolting flanges 16 and the attachment bolts 18 hold the thick flanges 15 in sealing engagement with the pressure gage attachment fitting 20 by tightening the nuts 19.

A pressure gage 27 is mounted on pressure gage fitting 24 so that internal pressure in the pipe sections 11 and 12 may be monitored. The pipeline comprising pipe sections 11 and 12 and additional pipe sections 11 and 12 may be fitted with a number of pressure gage attachment fittings 20 as described above. Such fittings are bolted between stepped flanges 13 and 14 at pump suction and discharge points in the system to monitor fluid pressure at these important points of the system. The fittings 20 can also be mounted at other points in the system where pipeline access is required. The fittings 20 can provide access to the pipeline for other purposes. For example, various reagents may be added to the pipeline flow by means of the fittings 20. Dyes may be injected into the pipeline through the fittings 20.

The typical use for the pipeline of this type is to conduct phosphate rock slurries from a phosphate mine to various refining operations including ore beneficiation. Such slurries cause uneven wear on the bottom inside surface of the pipe sections 11 and 12, and the pipe sections 11 and 12 are rotated on a periodic basis to prolong the useful life of the pipe sections 11 and 12.

Use of the pressure gage attachment fitting 20 greatly simplifies the steps involved with rotating a slurry pipeline as compared to the prior art procedures.

The attachment bolts 18 are simply loosened sufficiently to allow rotation of pipe sections 11 and 12 *without* rotating the pressure gage attachment fitting 20.

The pressure gage fitting 24 may be removed to provide clearance for rotation of the attachment bolts 18. After the desired rotation of pipe sections 11 and 12, the attachment bolts 18 are again tightened against the bolting flange 16 until the thick flanges 15 on the ends of pipe sections 11 and 12 become again sealed against the sealing gasket 25 of the pressure gage attachment fitting 20. After remounting the pressure gage attachment fitting 20 and pressure gage 27, the pipeline may be put back in service.

The pressure gage attachment fitting of the subject invention greatly simplifies slurry pipeline rotation because it eliminates the prior practice of tapping of a hole directly into the pipe sections to mount pressure gages. When the pipe sections were rotated according to this prior practice, it was necessary to plug the old access hole and tap a new one on the upper, accessible surface of the pipeline. All of these added tapping and plug welding steps are eliminated by the pressure gage attachment fitting of the subject invention.

I claim:

1. An improved, unitary access fitting for a pipeline comprising a ring member having an opening extending radially therethrough, said ring member being adapted to be sealingly disposed between the adjacent ends of two pipe sections interconnected by attaching means to provide a continuous conduit therethrough, said ring member being positioned entirely within the attaching means, and to provide external access to the interior of said pipeline through the opening in said ring member, and a sealing gasket disposed on, and substantially enclosing said ring member, said sealing gasket having a radial opening extending therethrough alined with the opening in said metal ring member, said opening in the ring member being free of said gasket, said sealing gasket being adapted to sealingly engage adjacent pipe sections when disposed therebetween while permitting external access to the interior of said pipeline through the opening therein and the alined opening in said metal ring member, whereby said ring member is protected from wear by the inner surface of said sealing gasket, a pressure gage being adapted to be removably mounted in an upright position on the opening of the ring member, the opening in said ring member can remain upwardly oriented when the pipe sections are rotated relative to the ring member and to a new position to equalize wear on the inner surfaces of the pipe sections.

2. The access fitting of claim 1, in which the sealing gasket comprises urethane.

3. A method of equalizing wear in a pipeline used to transport an abrasive ore slurry according to the access fitting of claim 1, the steps including loosening the attachment means, rotating the adjacent pipe sections while holding the ring member in fixed position, and thereafter retightening the attachment means to provide sealing engagement between the first pipe section, the ring member and the adjacent second pipe section.

* * * * *